(12) United States Patent
Liu

(10) Patent No.: US 12,533,219 B2
(45) Date of Patent: Jan. 27, 2026

(54) WATERWAY CONTROL DEVICE AND ORAL IRRIGATOR HANDLE

(71) Applicant: FLY CAT ELECTRICAL CO., LTD., Guangdong (CN)

(72) Inventor: Xinquan Liu, Guangdong (CN)

(73) Assignee: FLY CAT ELECTRICAL CO., LTD., Guangdong (CN)

( * ) Notice: Subject to any disclaimer, the term of this patent is extended or adjusted under 35 U.S.C. 154(b) by 952 days.

(21) Appl. No.: 17/726,242

(22) Filed: Apr. 21, 2022

(65) Prior Publication Data
US 2023/0200957 A1 Jun. 29, 2023

(30) Foreign Application Priority Data
Dec. 24, 2021 (CN) .......................... 202123304894.8

(51) Int. Cl.
*A61C 17/02* (2006.01)
(52) U.S. Cl.
CPC ................................ *A61C 17/0202* (2013.01)
(58) Field of Classification Search
CPC ... A61C 17/0202; A61C 1/0061; A61C 17/02; A61C 15/04; A61C 1/00; A61C 17/028; A61C 17/00; A61H 13/00; A61H 13/005; A61H 17/0205; A61H 17/0217
See application file for complete search history.

(56) References Cited

U.S. PATENT DOCUMENTS

2007/0203439 A1* 8/2007 Boyd .................. A61C 17/028
601/165
2018/0000527 A1* 1/2018 Deirmengian ......... A61B 5/103

FOREIGN PATENT DOCUMENTS

CH       631902 A5 *  9/1982   ......... A61C 17/0202
CH       657265 A5 *  8/1986   ......... A61C 17/0202

OTHER PUBLICATIONS

CH 631902 Machine Translation (Year: 2025).*
CH 657265 Machine Translation (Year: 2025).*

* cited by examiner

*Primary Examiner* — Kendra D Carter
*Assistant Examiner* — Arielle Wolff
(74) *Attorney, Agent, or Firm* — CANTOR COLBURN LLP

(57) ABSTRACT

A waterway control device is provided, which includes a valve body, a control member, a reset member and a push button. The valve body is provided with an accommodating cavity. The control member is arranged in the accommodating cavity. One end of the reset member abuts against the control member, and the other end of the reset member abuts against a wall of the accommodating cavity. The push button is movably arranged on the valve body, and provided with an introducing member. The introducing member is in sliding fit with the control member, and configured to cause the control member to move from a first position to a second position. The reset member enables the control member to restore and remain at the first position. The control member is capable of blocking the accommodating cavity at the first position, and opening the accommodating cavity at the second position.

14 Claims, 6 Drawing Sheets

WATERWAY CONTROL DEVICE AND ORAL IRRIGATOR HANDLE

CROSS-REFERENCE TO RELATED APPLICATION

Pursuant to 35 U.S.C. § 119 and the Paris Convention, this application claims the benefit of Chinese Patent Application No. 202123304894.8 filed on Dec. 24, 2021, the content of which is incorporated herein by reference.

TECHNICAL FIELD

The present disclosure relates to the field of oral cleaning technologies, and in particular, to a waterway control device and an oral irrigator handle.

BACKGROUND

An oral irrigator is a new oral cavity cleaning appliance, which can clean teeth and interdental spaces by spraying water columns and also has an effect of massage. With the development of the oral irrigator, a desktop oral irrigator has appeared. In the use of the desktop oral irrigator, since a control button such as a power supply of the oral irrigator is generally arranged on a body of the desktop oral irrigator, it is inconvenient to control the desktop oral irrigator to start, stop, and pause rinsing teeth in the use of the desktop oral irrigator.

In the conventional art, a switch is generally arranged on an oral irrigator handle, through which opening and closing of a waterway is achieved.

However, a structure of the switch on the current oral irrigator handle for achieving the opening and closing of the waterway is relatively complicated, which requires higher costs, and brings great difficulty to installation, machining, and manufacturing.

SUMMARY

In view of the above, there is a need to provide a waterway control device and an oral irrigator handle with respect to the problem of how to simplify the structure of the oral irrigator handle.

Disclosed is a waterway control device. The waterway control device includes a valve body, a control member, a reset member, and a push button. The valve body is provided with an accommodating cavity, the control member is arranged in the accommodating cavity. One end of the reset member abuts against the control member, the other end of the reset member abuts against a wall of the accommodating cavity. The push button is movably arranged on the valve body, the push button is provided with an introducing member. The introducing member is in sliding fit with the control member, the introducing member is configured to cause the control member to move from a first position to a second position when the push button moves relative to the valve body, and the reset member enables the control member to restore and remain at the first position. The control member is capable of blocking the accommodating cavity when the control member is at the first position. The control member is capable of opening the accommodating cavity when the control member is at the second position.

In one embodiment, the wall of the accommodating cavity is provided with a water inlet and a water outlet, and the control member is arranged in the accommodating cavity. The control member is in sealing fit with the water inlet and/or the water outlet when the control member is at the first position. The control member is out of the sealing fit with the water inlet and the water outlet when the control member is at the second position.

In one embodiment, an inner diameter of the accommodating cavity gradually increases along a direction from the first position to the second position, and a shape of the control member matches that of the accommodating cavity.

In one embodiment, one side of the valve body adjacent to the push button is provided with a perforation in communication with the accommodating cavity, the control member includes an abutment portion, and the abutment portion passes through the perforation to be in sliding fit with the introducing member.

In one embodiment, the control member further includes a sealing body, the sealing body is a flexible body, the sealing body is arranged on the abutment portion, and the sealing body is capable of being in flexible sealing fit with the water inlet and/or the water outlet when the control member is at the first position.

In one embodiment, the control member is further provided with a first seal ring, the accommodating cavity includes a first fitting cavity, the water inlet and the perforation are provided on two ends of the wall of the accommodating cavity opposite to a sidewall of the first fitting cavity, the first seal ring is capable of being kept in abutment and fit with a wall of the first fitting cavity, and the water outlet and the water inlet are provided on a same end of the wall of the accommodating cavity opposite to the wall of the first fitting cavity.

In one embodiment, the wall of the accommodating cavity is provided with a guide member, an extension direction of the guide member is the same as a movement direction of the control member, and the control member is provided with a guide hole fitting with the guide member.

In one embodiment, the valve body is provided with a guide slot, an extension direction of the guide slot is the same as a movement direction of the push button, and the push button is provided with a slider in sliding fit with the guide slot.

In one embodiment, the introducing member includes a pressing portion and a retaining portion connected to the pressing portion, a vertical distance between the pressing portion and the control member gradually decreases along a movement direction of the push button, a vertical distance between the retaining portion and the control member is unchanged along the movement direction of the push button, and the vertical distance between the retaining portion and the control member is less than a minimum value of the vertical distance between the pressing portion and the control member.

Disclosed is an oral irrigator handle. The oral irrigator handle includes: the waterway control device according to any one of the embodiments as described above; a housing; a spray pipe and an inlet pipe. The waterway control device is arranged in the housing, the housing is provided with a via hole, and the push button is arranged to pass through the via hole to the outside of the housing. The spray pipe is arranged to pass through the housing, the spray pipe is provided with an outlet conduit, and the outlet conduit is in communication with the accommodating cavity. The inlet pipe passing through the housing, the inlet pipe being provided with an inlet conduit, and the inlet conduit is in communication with the accommodating cavity.

In the aforementioned waterway control device, the valve body is provided with the accommodating cavity configured to convey liquid. The push button can move relative to the valve body, and when the push button moves relative to the valve body, the introducing member enables the control member to move from the first position to the second position. The reset member enables the control member to restore and remain at the first position. In this way, the accommodating cavity can be opened and blocked, so as to control the conveying of liquid by the accommodating cavity.

Figure 1:
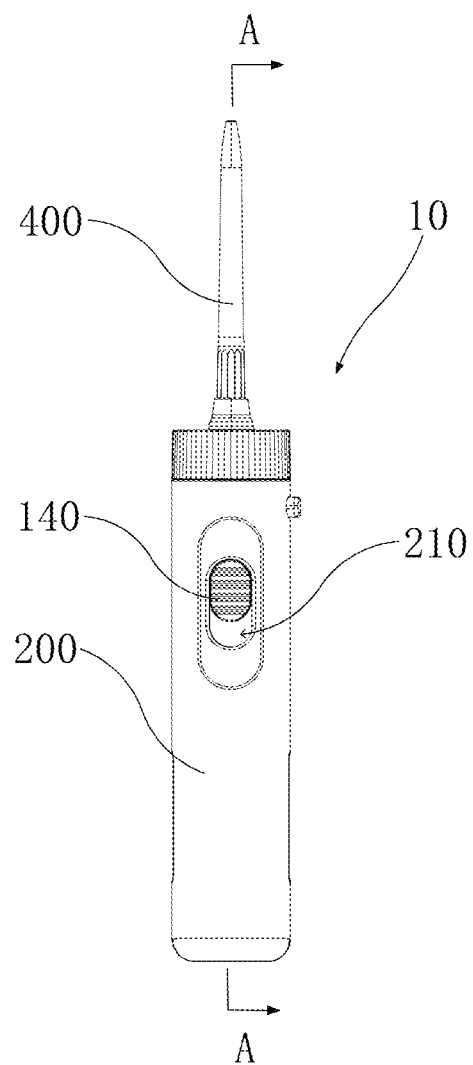
FIG. 1 is a schematic axonometric view of an oral irrigator handle according to an embodiment.

Reference numerals: 10: oral irrigator handle; 100: waterway control device; 110: valve body; 1110: accommodating cavity; 1111: first fitting cavity; 1111a: top wall; 1111b: sidewall; 1111c: perforation; 1112: communicating cavity; 1112a: water inlet; 1112b: water outlet; 1112c: protrusion; 1113: second fitting cavity; 1113a: bottom wall; 1113b: through hole; 112: inlet pipeline; 113: outlet pipeline; 114: guide slot; 114a: first groove; 115: bonnet; 115a: second seal ring; 115b: guide member; 120: control member; 121: abutment portion; 121a: convex portion; 121b: guide hole; 122: sealing body; 122a: concave portion; 122b: first seal ring; 130: reset member; 140: push button; 141: threading portion; 1420: fitting portion; 1421: slider; 1422: introducing member; 1422a: pressing portion; 1422b: retaining portion; 1423: second groove; 200: housing; 210: via hole; 300: inlet pipe; 310: inlet conduit; 400: spray pipe; 410: outlet conduit.

DETAILED DESCRIPTION OF THE EMBODIMENTS

In order to make the above objectives, features and advantages of the present disclosure more obvious and understandable, specific implementations of the present disclosure are described in detail below with reference to the drawings. In the following description, many specific details are set forth in order to fully understand the present disclosure. However, the present disclosure can be implemented in many other ways different from those described herein, and those skilled in the art can make similar improvements without departing from the concept of the present disclosure. Therefore, the present disclosure is not limited by the specific embodiments disclosed below.

In the description of the present disclosure, it should be understood that the orientation or position relationship indicated by the terms "center", "longitudinal", "transverse", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the drawings and are intended to facilitate the description of the present disclosure and simplify the description only, rather than indicating or implying that the apparatus or element referred to must have a particular orientation or be constructed and operated in a particular orientation, and therefore are not to be interpreted as limiting the present disclosure.

In addition, the terms "first" and "second" are used for descriptive purposes only, which cannot be construed as indicating or implying a relative importance, or implicitly specifying the number of the indicated features. Thus, the features defined with "first" and "second" may explicitly or implicitly include one or more features. In the description of the present disclosure, the phrase "a plurality of" means two or more, for example, two or three, unless specifically stated otherwise.

In the present disclosure, unless otherwise explicitly specified and defined, the terms "mount/install", "in connection/communication with" "connect" and "fix" should be understood in a broad sense, such as, a fixed connection, a detachable connection, or an integral connection; a mechanical connection, or an electrical connection; a direct connection, an indirect connection through an intermediate medium, an internal connection of two elements, or an interaction of two elements, unless otherwise explicitly defined. For those of ordinary skill in the art, the specific meanings of the above terms in the present disclosure can be understood on a case-by-case basis.

In the present disclosure, unless otherwise explicitly specified and defined, the expression a first feature being "on" or "under" a second feature may be the case that the first feature is in direct contact with the second feature, or the first feature is in indirect contact with the second feature via an intermediate medium. Furthermore, the expression the first feature being "over", "above" and "on top of" the second feature may be the case that the first feature is directly above or obliquely above the second feature, or only means that the level of the first feature is higher than that of the second feature. The expression the first feature being "below", "underneath" or "under" the second feature may be the case that the first feature is directly underneath or obliquely underneath the second feature, or only means that the level of the first feature is lower than that of the second feature.

It should be noted that, when one element is referred to as "being fixed to" or "being arranged on" another element, the element may be directly on another element or an intermediate element may also exist. When one element is considered to be "connected to" another element, the element may be directly connected to another element or an intermediate element may coexist. The terms "vertical", "horizontal", "up", "down", "left", "right" and similar expressions used herein are for illustrative purposes only and do not mean that they are the only means of implementation.

Figure 2:
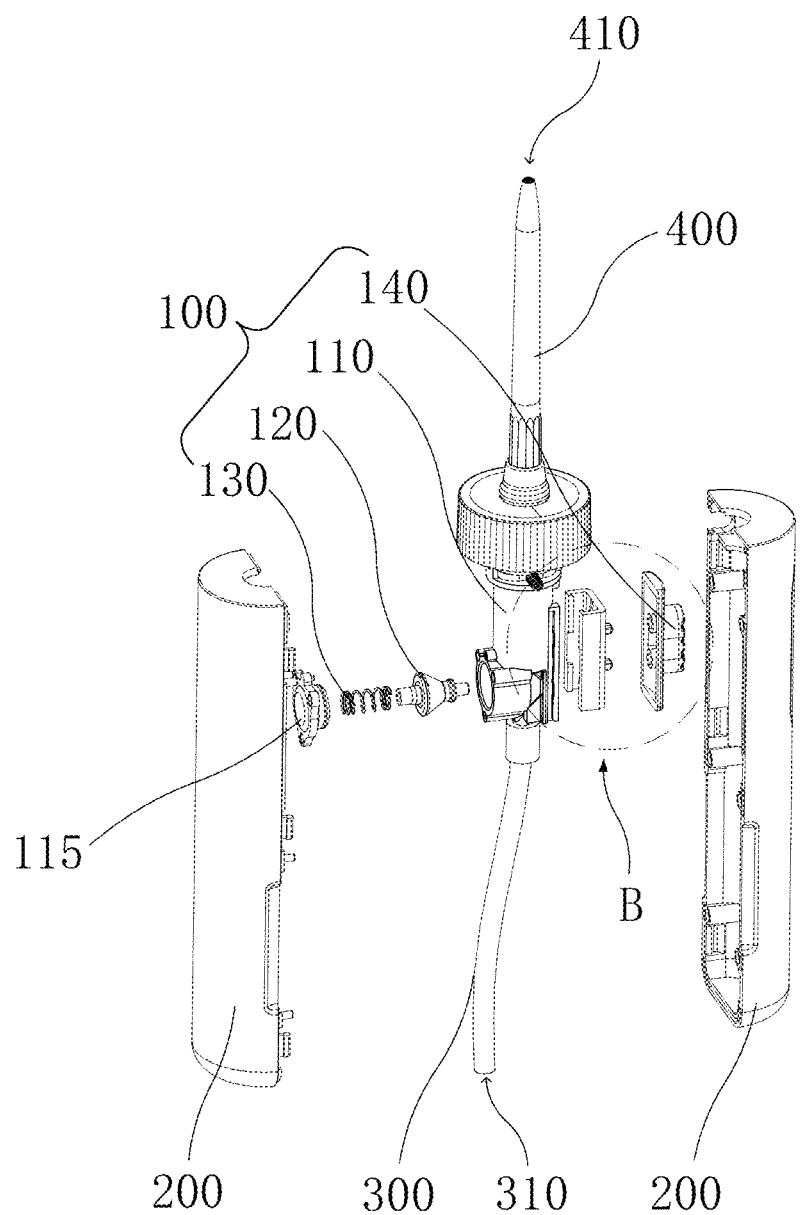
FIG. 2 is a schematic exploded view of the oral irrigator handle shown in FIG. 1.
Figure 3:
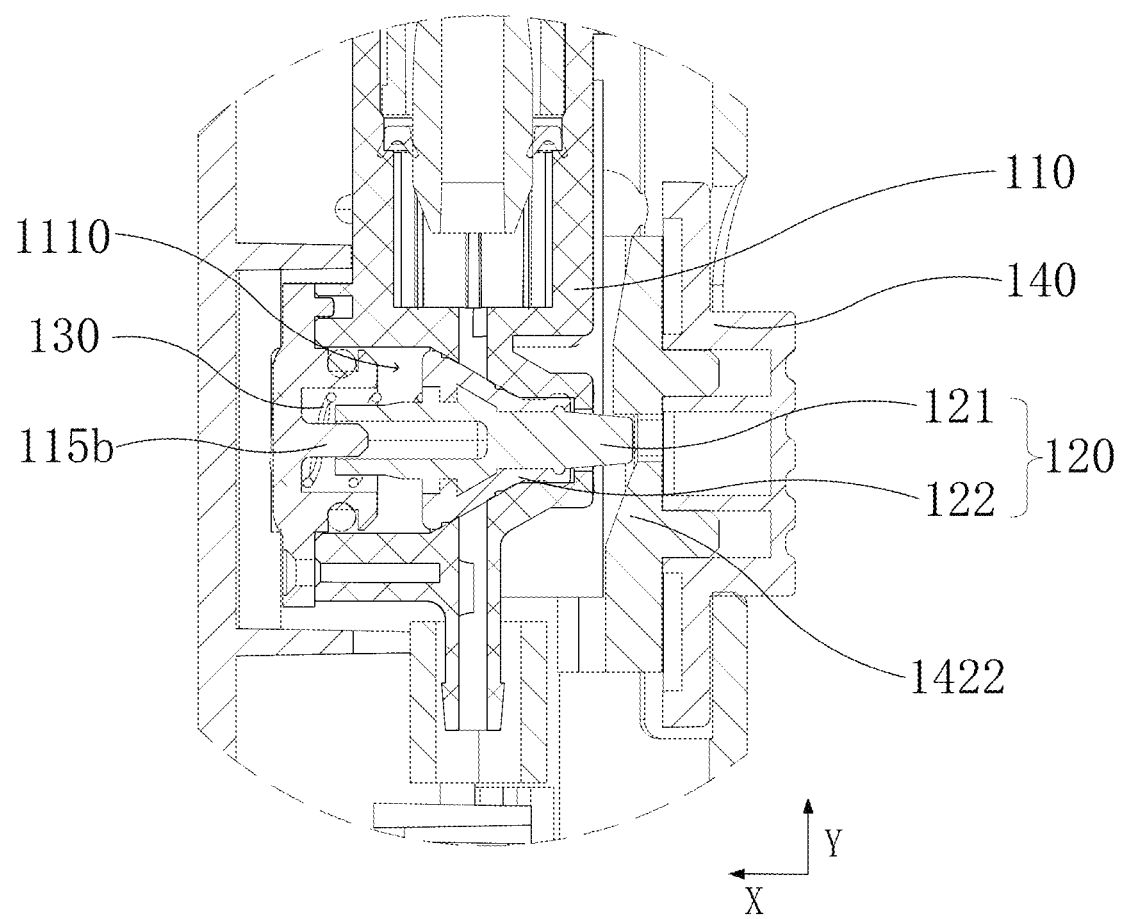
FIG. 3 is a sectional view of a waterway control device taken along a line A-A in FIG. 1 when a control member is at a first position.

Referring to FIG. 1, FIG. 1 is a schematic axonometric view of an oral irrigator handle according to an embodiment of the present disclosure. FIG. 2 is a schematic exploded view of the oral irrigator handle shown in FIG. 1. FIG. 3 is a sectional view of a waterway control device taken along a line A-A in FIG. 1 when a control member is at a first position.

Referring to FIG. 1 and FIG. 2, the oral irrigator handle 10 according to an embodiment of the present disclosure includes a housing 200, a waterway control device 100, a spray pipe 400, and an inlet pipe 300. The waterway control device 100 is arranged in the housing 200. The spray pipe 400 is arranged to pass through the housing 200. The inlet pipe 300 is arranged to pass through the housing 200.

The inlet pipe 300 is connected to the waterway control device 100 to convey liquid to the waterway control device 100. The spray pipe 400 is also connected to the waterway control device 100 to receive the liquid conveyed by the waterway control device 100 and spray out the liquid. In other words, the liquid can flow out through the inlet pipe 300, the waterway control device 100 and the spray pipe 400 successively. The waterway control device 100 includes a blocked state and an open state. That is, the waterway control device 100 can control whether the liquid in the inlet pipe 300 enters the waterway control device 100, and/or the waterway control device 100 can control whether the liquid therein enters the spray pipe 400.

Referring to FIG. 2 and FIG. 3, in one embodiment, the waterway control device 100 includes a valve body 110, a control member 120, a reset member 130, and a push button 140. The valve body 110 is provided with an accommodating cavity 1110. The control member 120 is arranged in the accommodating cavity 1110. One end of the reset member 130 abuts against the control member 120, and the other end of the reset member 130 abuts against a wall of the accommodating cavity 1110. The push button 140 is movably arranged on the valve body 110, and the push button 140 is provided with an introducing member 1422.

The introducing member 1422 is in sliding fit with the control member 120. The introducing member 1422 is configured to cause the control member 120 to move from a first position to a second position when the push button 140 moves relative to the valve body 110. The reset member 130 enables the control member 120 to restore and remain at the first position.

The control member 120 is capable of blocking the accommodating cavity 1110 when the control member 120 is at the first position.

The control member 120 is capable of opening the accommodating cavity 1110 when the control member 120 is at the second position.

In the aforementioned waterway control device 100, the valve body 110 is provided with the accommodating cavity 1110 configured to convey liquid. The push button 140 can move relative to the valve body 110, and when the push button 140 moves relative to the valve body 110, the introducing member 1422 enables the control member 120 to move from the first position to the second position. The reset member 130 enables the control member 120 to restore and remain at the first position. In this way, the accommodating cavity 1110 can be opened and blocked by driving the control member 120 to move between the first position and the second position, to control the conveying of liquid by the accommodating cavity 1110.

It should be understood that, in one embodiment, the inlet pipe 300 is provided with an inlet conduit 310, and the inlet conduit 310 is in communication with the accommodating cavity 1110. The spray pipe 400 is provided with an outlet conduit 410, and the outlet conduit 410 is in communication with the accommodating cavity 1110. In this way, the accommodating cavity 1110 is blocked so that the liquid in the inlet pipe 300 cannot enter the accommodating cavity 1110. When the accommodating cavity 1110 is blocked, the liquid in the accommodating cavity 1110 cannot enter the outlet conduit 410. Similarly, when the accommodating cavity 1110 is opened, the inlet conduit 310 can be communicated with the outlet conduit 410 through the accommodating cavity 1110. Thus, the liquid can flow in from the inlet conduit 310 and flow out from the outlet conduit 410 through the accommodating cavity 1110.

Referring to FIG. 1, in one embodiment, the housing 200 is provided with a via hole 210. The push button 140 is arranged to pass through the via hole 210 to the outside of the housing 200. In this way, it is convenient to control the push button 140 to move relative to the valve body 110.

Figure 4:
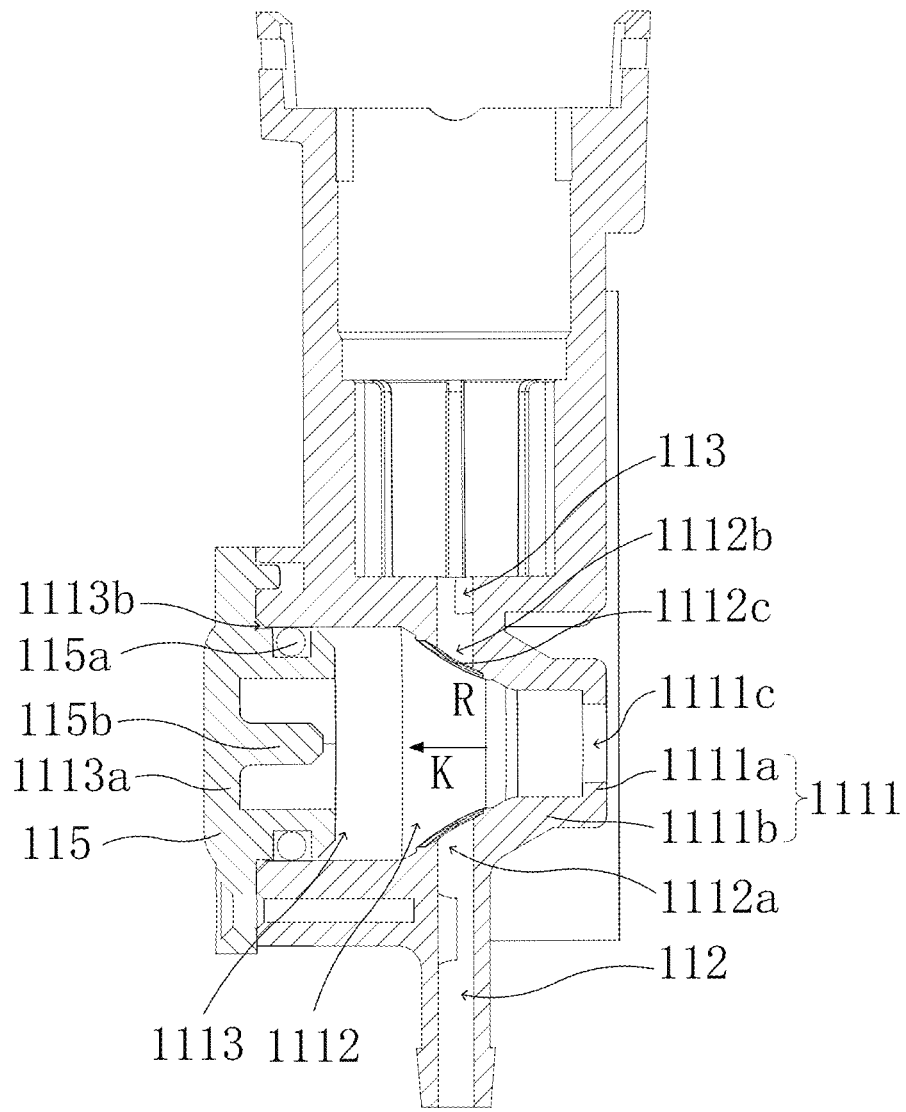
FIG. 4 is a sectional view of a pump body in the oral irrigator handle shown in FIG. 1 taken along the line A-A in FIG. 1.

Referring to FIG. 3 and FIG. 4, in one embodiment, the wall of the accommodating cavity 1110 is provided with a water inlet 1112a and a water outlet 1112b.

The control member 120 is in sealing fit with the water inlet 1112a and/or the water outlet 1112b when the control member 120 is at the first position.

The control member 120 is out of the sealing fit with the water inlet 1112a and the water outlet 1112b when the control member 120 is at the second position.

The control member 120 is in sealing fit with the water inlet 1112a and/or the water outlet 1112b to enable the waterway to be blocked. That is, the liquid cannot enter the spray pipe 400. When the control member 120 is out of the sealing fit with the water inlet 1112a and the water outlet 1112b, the inlet conduit 310 can be communicated with the outlet conduit 410 through the accommodating cavity 1110.

Referring to FIG. 4, in the above embodiments, the valve body 110 is also provided with an inlet pipeline 112 and an outlet pipeline 113. The accommodating cavity 1110 is in communication with the inlet pipeline 112, and the accommodating cavity 1110 is also in communication with the outlet pipeline 113. Specifically, one end of the inlet pipeline 112 is in communication with the accommodating cavity 1110 through the water inlet 1112a, and the other end of the inlet pipeline 112 is in communication with the inlet conduit 310. The inlet pipeline 112 can receive the liquid conveyed from the inlet conduit 310, and causes the liquid to enter the accommodating cavity 1110 through the water inlet 1112a. One end of the outlet pipeline 113 is in communication with the accommodating cavity 1110 through the water outlet 1112b, and the other end of the outlet pipeline 113 is in communication with the outlet conduit 410. The liquid in the accommodating cavity 1110 can enter the outlet pipeline 113 through the water outlet 1112b. The outlet pipeline 113 conveys the liquid from the accommodating cavity 1110 into the outlet conduit 410. The liquid is finally sprayed out through the spray pipe 400, to realize the conveying of the liquid. It may be understood that the above descriptions related to the liquid conveying process are all the conveying of the liquid when the control member 120 is at the second position. When the control member 120 is at the first position, the waterway control device 100 is in the blocked state.

Referring to FIG. 4, in one embodiment, an inner diameter of the accommodating cavity 1110 gradually increases along a direction from the first position to the second position, and a shape of the control member 120 matches that of the accommodating cavity 1110. Referring to FIG. 4, the direction from the first position to the second position is indicated by the arrow K. The inner diameter of the accommodating cavity 1110 is shown by dotted line R. The inner diameter of the accommodating cavity 1110 gradually increases along the direction from the first position to the second position, and the shape of the control member 120 matches that of the accommodating cavity 1110. Thus, when the control member 120 moves from the first position to the second position, the control member 120 can be separated from the wall of the accommodating cavity 1110. Then, the control member 120 can be out of the sealing fit with the water inlet 1112a and the water outlet 1112b. That is, in this embodiment, the push button 140 enables the control member 120 to be out of the sealing fit with the water inlet 1112a and the water outlet 1112b only by displacing the control member 120 relative to the wall of the accommodating cavity 1110. Such arrangement enables the driving movement of the push button 140 to be easier.

Figure 5:
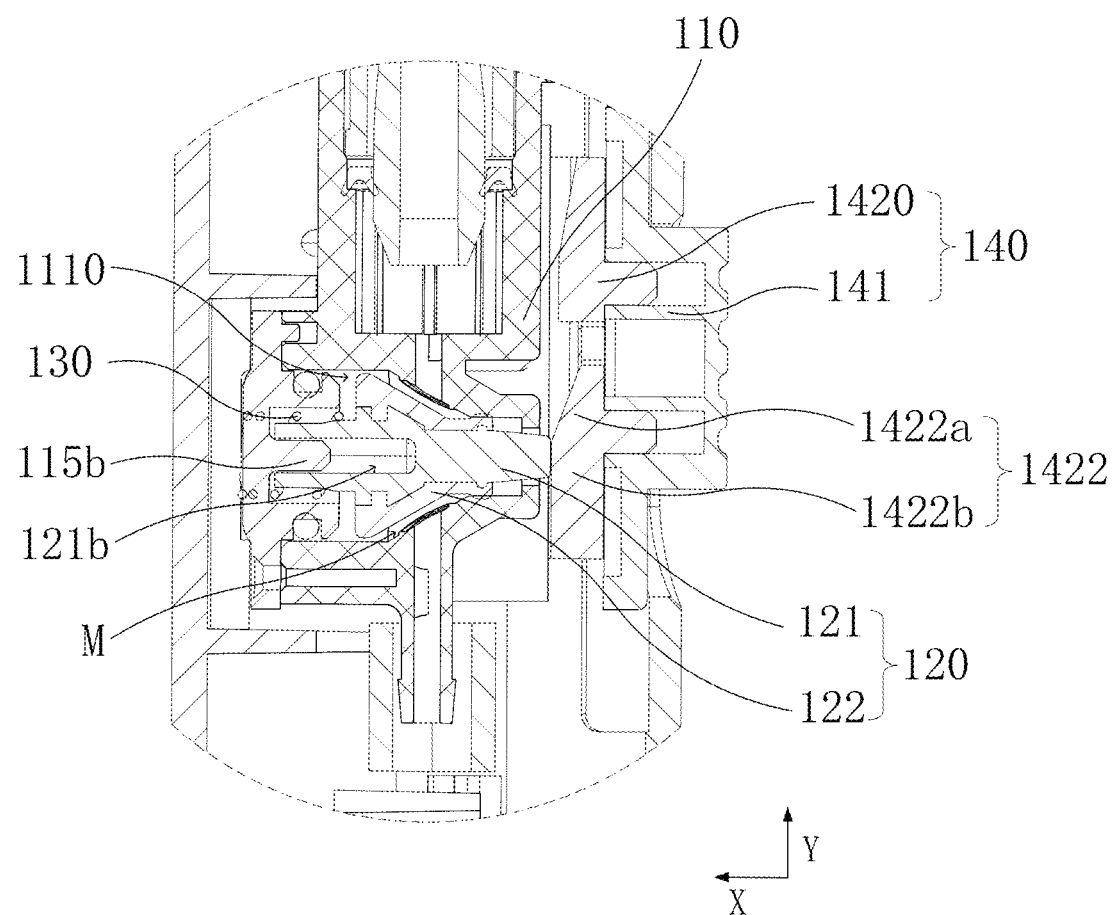
FIG. 5 is a sectional view of the waterway control device taken along the line A-A in FIG. 1 when the control member is at a second position.

Referring to FIG. 3 and FIG. 5, it may be understood that the control member 120 shown in FIG. 3 is at the first position. In this case, the control member 120 keeps sealing fit with both the water inlet 1112a and the water outlet 1112b, and the accommodating cavity 1110 is blocked by the control member 120. That is, in this case, the waterway control device 100 is in the blocked state. The control member 120 shown in FIG. 5 is at the second position. In this case, the control member 120 is separated from the wall of the accommodating cavity 1110. That is, when the control member 120 moves from the first position to the second position, a gap is formed between the control member 120 and the wall of the accommodating cavity 1110. In this way, the liquid can flow in the accommodating cavity 1110 through the gap, enabling both the inlet pipeline 112 and the outlet pipeline 113 to be communicated with the accommodating cavity 1110. That is, in this case, the waterway control device 100 is in the open state. The gap is referred to as reference numeral M in FIG. 5.

Figure 6:
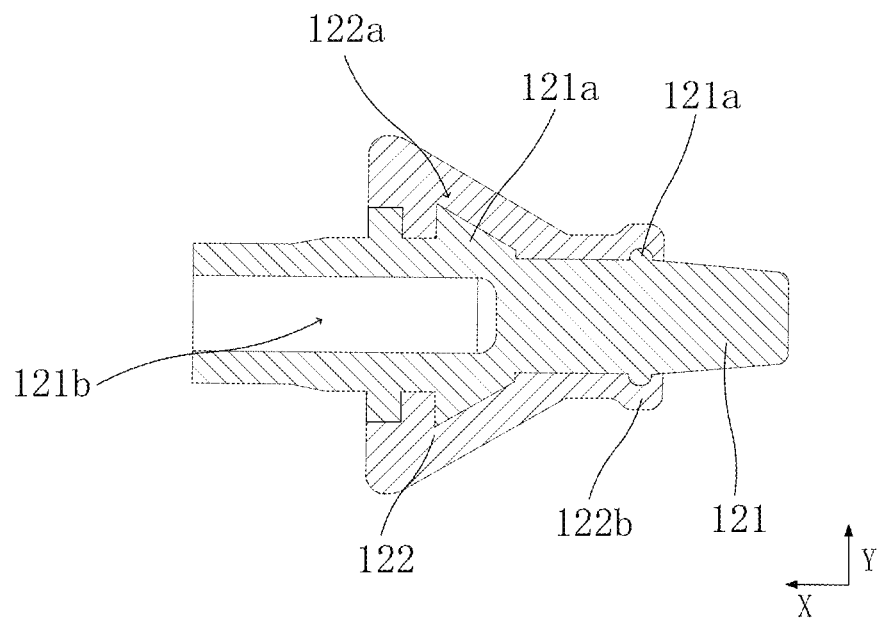
FIG. 6 is a sectional view of the control member in the oral irrigator handle shown in FIG. 1 taken along the line A-A in FIG. 1.

Referring to FIG. 6 together with FIG. 4, in one embodiment, one side of the valve body 110 adjacent to the push button 140 is provided with a perforation 1111c in communication with the accommodating cavity 1110. The control member 120 includes an abutment portion 121, and the abutment portion 121 is arranged to pass through the perforation 1111c to be in sliding fit with the introducing member 1422. In this way, when the push button 140 slides relative to the valve body 110, the introducing member 1422 can press against the abutment portion 121 to enable the control member 120 to move from the first position to the second position. In this way, the push button 140 moves relative to the valve body 110 to enable the control member 120 to move from the first position to the second position, so as to block and open the accommodating cavity 1110.

Still referring to FIG. 6, in one embodiment, the control member 120 further includes a sealing body 122. The sealing body 122 is a flexible body, and the sealing body 122 is arranged on the abutment portion 121. The sealing body 122 can be in flexible sealing fit with the water inlet 1112a and/or the water outlet 1112b when the control member 120 is at the first position. The arrangement of the flexible sealing body 122 can improve sealing performance of the sealing fit of the control member 120 with the water inlet 1112a and/or the water outlet 1112b. The sealing body 122 may specifically be made of, for example, silicone, rubber or other materials. It should be understood that the sealing body 122 may also be made of other flexible materials, which may be arranged according to actual requirements and is not limited herein.

In the above embodiments, the sealing body 122 may be sleeved on the abutment portion 121, and the sealing body 122 can move between the first position and the second position along with the abutment portion 121 under the action of the introducing member 1422. Specifically, the abutment portion 121 is provided with a plurality of convex portions 121a on a circumferential wall thereof. An inner wall of the sealing body 122 is provided with a plurality of concave portions 122a fitting with the convex portions 121a. The fitting between the concave portions 122a and the convex portions 121a enables the sealing body 122 to move between the first position and the second position along with the abutment portion 121. It may be understood that the convex portions 121a are arranged around the circumferential wall of the abutment portion 121. Correspondingly, the concave portions 122a are arranged around the inner wall of the sealing body 122.

Referring to FIG. 4, in one embodiment, the wall of the accommodating cavity 1110 is provided with at least two protrusions 1112c. The at least two protrusions 1112c are arranged around the water inlet 1112a and the water outlet 1112b, respectively. Since the sealing body 122 is a flexible member, when the control member 120 is switched from the second position to the first position, an instantaneous water flow at the water inlet 1112a and the water outlet 1112b is of great strength, which may impact the flexible sealing body 122 and deform the sealing body 122, thereby leading to failure of the sealing of the control member 120. In this embodiment, the protrusions 1112c respectively around the water inlet 1112a and the water outlet 1112b are arranged on the wall of the accommodating cavity 1110, so that the sealing body 122 may not be separated from the wall of the accommodating cavity 1110 even if the sealing body 122 is slightly deformed at the water inlet 1112a and the water outlet 1112b. In this way, leakage at the water inlet 1112a and the water outlet 1112b caused by slight deformation of the flexible sealing body 122 can be prevented.

Still referring to FIG. 6 together with FIG. 4, in one embodiment, the control member 120 is also provided with a first seal ring 122b. The accommodating cavity 1110 includes a first fitting cavity 1111. The water inlet 1112a and the perforation 1111c are provided on two ends of the wall of the accommodating cavity 1110 opposite to a sidewall 1111b of the first fitting cavity 1111. The first seal ring 122b can be kept in abutment and fit with a wall of the first fitting cavity 1111, and the water outlet 1112b and the water inlet 1112a are provided on a same end of the wall of the accommodating cavity 1110 opposite to the wall of the first fitting cavity 1111. It may be understood that the wall of the first fitting cavity 1111 includes a top wall 1111a and the sidewall 1111b connected to a periphery of the top wall 1111a. The perforation 1111c is arranged on the top wall 1111a.

The water inlet 1112a and the perforation 1111c are provided on two ends of the wall of the accommodating cavity 1110 opposite to the sidewall 1111b of the first fitting cavity 1111, and the first seal ring 122b is kept in abutment and fit with the wall of the first fitting cavity 1111. Such arrangement can prevent leakage of the liquid caused by flowing of the liquid, which is conveyed by the water inlet 1112a and the water outlet 1112b, out of the accommodating cavity 1110 from the perforation 1111c.

It may be understood that the first seal ring 122b may be arranged on the sealing body 122. Alternatively, the first seal ring 122b may be directly arranged on the circumferential wall of the abutment portion 121, which may be arranged according to actual requirements and is not limited herein.

Still referring to FIG. 6, in one embodiment, specifically, the accommodating cavity 1110 also includes a communicating cavity 1112 and a second fitting cavity 1113. A wall on one end of the communicating cavity 1112 is connected to the wall of the first fitting cavity 1111, and a wall on the other end of the communicating cavity 1112 is connected to the second fitting cavity 1113. It may be understood that one end on the sidewall 1111b of the first fitting cavity 1111 away from the top wall 1111a is connected to the wall of the communicating cavity 1112.

The water inlet 1112a and the water outlet 1112b are provided on the wall of the communicating cavity 1112. The inner diameter of the accommodating cavity 1112 gradually increases along the direction from the first position to the second position. The shape of the control member 120 matches that of the communicating cavity 1112.

One end of the reset member 130 abuts against a bottom wall 1113a of the second fitting cavity 1113, and the other end of the reset member 130 abuts against the control member 120, causing the control member 120 to move from the second position to the first position.

Referring to FIG. 6 again, a position of at least one of the plurality of convex portions 121a provided on the circumferential wall of the abutment portion 121 corresponds to that of the first seal ring 122b. Referring to FIG. 6, the position of the at least one convex portion 121a corresponding to that of the first seal ring 122b means that positions of the first seal ring 122b and the protrusion 1112c in an X-axis direction are the same or nearly the same. With the arrangement, the protrusion 1112c supports the first seal ring 122b, which can also ensure that the first seal ring 122b can stably abut against the wall of the accommodating cavity 1110. Moreover, a play of the first seal ring 122b in the X-axis direction relative to the abutment portion 121 caused by friction between the first seal ring 122b and the wall of the accommodating cavity 1110 during the movement of the control member 120 can also be prevented, avoiding failure of the sealing caused by transmission of the first seal ring 122b.

It may be understood that a positive direction of the X axis is the same as a direction of the arrow K. That is, the positive direction of the X axis is the direction from the first position to the second position.

Referring to FIG. 4 and FIG. 6, in one embodiment, the wall of the accommodating cavity 1110 is provided with a guide member 115b, an extension direction of the guide member 115b is the same as a movement direction of the control member 120, and the control member 120 is provided with a guide hole 121b fitting with the guide member 115b. In this way, the fitting between the guide member 115b and the guide hole 121b can ensure accuracy of the movement of the control member 120 between the first position and the second position. It may be understood that the extension direction of the guide member 115b is opposite to that of the arrow K, and the guide hole 121b extends along a negative direction of the X axis. Specifically, the guide member 115b is arranged on the bottom wall 1113a of the second fitting cavity 1113.

Referring to FIG. 5 together with FIG. 3, in one embodiment, the reset member 130 may specifically be, for example, a pressure spring. The reset member 130 may be sleeved on the guide member 115b. In this way, the guide member 115b can also limit a direction of telescopic movement of the reset member 130. In this way, it is ensured that the reset member 130 can stably drive the control member 120 to move from the second position to the first position.

Figure 7:
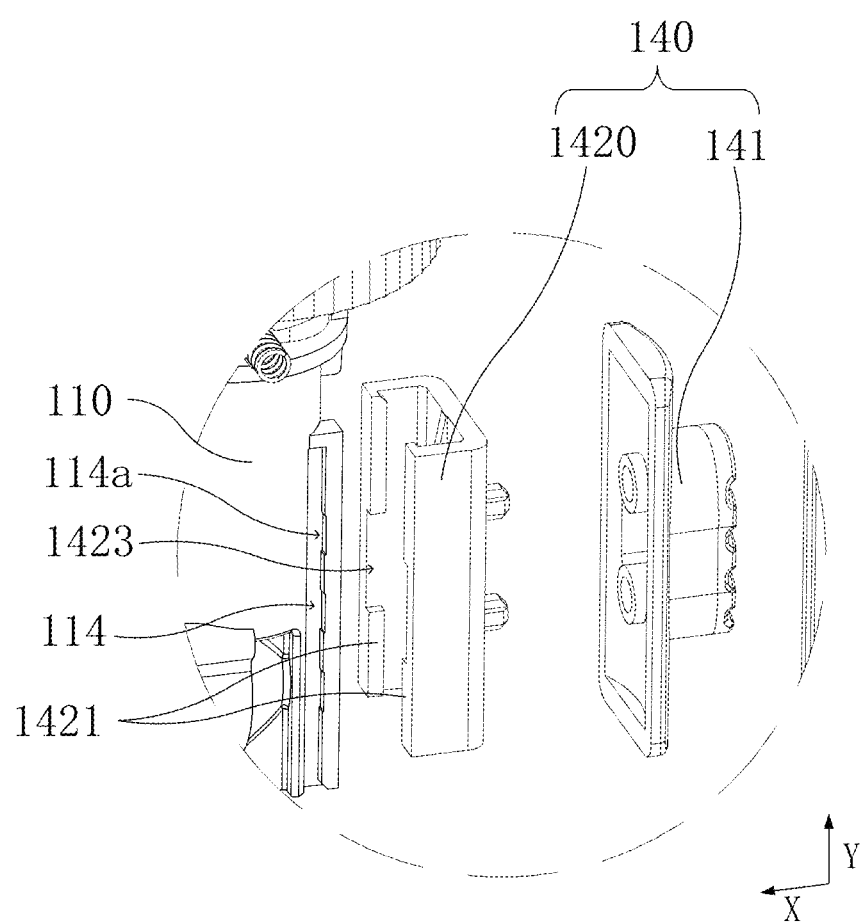
FIG. 7 is a partial enlarged view of a portion B in FIG. 2.

Referring to FIG. 7, in one embodiment, the valve body 110 is provided with a guide slot 114, an extension direction of the guide slot 114 is the same as a movement direction of the push button 140, and the push button 140 is provided with a slider 1421 in sliding fit with the guide slot 114. In this way, the fitting between the slider 1421 and the guide slot 114 can ensure the accuracy of the movement of the push button 140 relative to the valve body 110. Referring to FIG. 7, the movement direction of the push button 140 and the extension direction of the guide slot 114 are the same as a negative direction of the Y axis.

Referring to FIG. 3 and FIG. 5 again, in one embodiment, the introducing member 1422 includes a pressing portion 1422a and a retaining portion 1422b connected to the pressing portion 1422a. A vertical distance between the pressing portion 1422a and the control member 120 gradually decreases along a movement direction of the push button 140. A vertical distance between the retaining portion 1422b and the control member 120 is unchanged along the movement direction of the push button 140, and the vertical distance between the retaining portion 1422b and the control member 120 is less than a minimum value of the vertical distance between the pressing portion 1422a and the control member 120. Referring to FIG. 5, the vertical distance between the pressing portion 1422a and the control member 120 and the vertical distance between the retaining portion 1422b and the control member 120 refer to distances of the pressing portion 1422a and the retaining portion 1422b in the X-axis direction.

The control member 120 shown in FIG. 3 is at the first position, and the control member 120 shown in FIG. 5 is at the second position. When the push button 140 is pushed along the negative direction of the Y axis from the state shown in FIG. 3, since the vertical distance between the pressing portion 1422a and the control member 120 gradually decreases along the movement direction of the push button 140, the guide member 115b can gradually press the control member 120 during the movement along the negative direction of the Y axis, enabling the control member 120 to move along the positive direction of the X axis. That is, the control member 120 moves from the first position to the second position.

The vertical distance between the retaining portion 1422b and the control member 120 is unchanged along the movement direction of the push button 140. That is, contact with the push button 140 at any point on the retaining portion 1422b in the Y-axis direction may not cause the control member to move. That is, the control member 120 can be retained at a current position. Moreover, the vertical distance between the retaining portion 1422b and the control member 120 is less than a minimum value of the vertical distance between the pressing portion 1422a and the control member 120. So, when the push button 140 moves along the negative direction of the Y axis until the retaining portion 1422b is in contact with the control member 120, the control member 120 can be at the second position and retained at the second position.

Still referring to FIG. 7, in one embodiment, a sidewall 1111b of the guide slot 114 in contact with the slider 1421 is provided with a plurality of first grooves 114a. A sidewall 1111b of the slider 1421 in contact with a wall of the guide slot 114 is provided with a plurality of second grooves 1423. In this way, an area of contact between the wall of the guide slot 114 and the slider 1421 can be reduced through the first groove 114a and the second groove 1423. Thus, friction when the push button 140 slides relative to the valve body 110 can be reduced. Then, the movement of the push button 140 can be facilitated.

Still referring to FIG. 7, in one embodiment, the push button 140 includes a threading portion 141 and a fitting portion 1420 connected to the threading portion 141. The introducing member 1422 and the slider 1421 are arranged on one side of the fitting portion 1420 adjacent to the valve body 110. The threading portion 141 is arranged to pass through the via hole 210 to the outside of the housing 200, so as to control the threading portion 141 to enable the fitting portion 1420 to move relative to the valve body 110.

Referring to FIG. 4 again, in one embodiment, the valve body 110 is also provided with a bonnet 115 and a second seal ring 115a. One side of a wall of the second fitting cavity 1113 away from the communicating cavity 1112 is provided with a through hole 1113b. The bonnet 115 is in sealing fit with a wall of the through hole 1113b. The bonnet 115 and the valve body 110 together enclose to form the accommodating cavity 1110. Specifically, the second seal ring 115a is arranged around the bonnet 115, and the second seal ring 115a can simultaneously abut against the bonnet 115 and the wall of the through hole 1113b. In this way, the bonnet 115 and the through hole 1113b can be sealed relatively. It may be understood that, the guide member 115b may be arranged on the bonnet 115.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted for those of ordinary skill in the art that variations and improvements may also be made without departing from the conception of the present disclosure, all of which fall within the protection scope of the present disclosure. Therefore, the patent protection scope of the present disclosure should be subject to the appended claims.

What is claimed is:

1. A waterway control device, comprising:
a valve body, provided with an accommodating cavity;
a control member, arranged in the accommodating cavity;
a reset member, one end of the reset member abutting against the control member, and another end of the reset member abutting against a wall of the accommodating cavity; and
a push button, movably arranged on the valve body, and provided with an introducing member, the introducing member being in sliding fit with the control member; wherein
the introducing member is configured to cause the control member to move from a first position to a second position when the push button moves relative to the valve body, and the reset member enables the control member to restore and remain at the first position,
the control member is capable of blocking the accommodating cavity when the control member is at the first position,
the control member is capable of opening the accommodating cavity when the control member is at the second position,
an inner diameter of the accommodating cavity gradually increases along a direction from the first position to the second position, and a shape of the control member matches a shape of the accommodating cavity,
the valve body is provided with a guide slot, an extension direction of the guide slot is the same as a movement direction of the push button, and the push button is provided with a slider in sliding fit with the guide slot, and
a sidewall of the guide slot in contact with the slider is provided with a plurality of first grooves, and a sidewall of the slider in contact with a wall of the guide slot is provided with a plurality of second grooves.

2. The waterway control device according to claim 1, wherein the wall of the accommodating cavity is provided with a water inlet and a water outlet, and the control member is arranged in the accommodating cavity;
the control member is in sealing fit with the water inlet and/or the water outlet when the control member is at the first position; and
the control member is out of the sealing fit with the water inlet and the water outlet when the control member is at the second position.

3. The waterway control device according to claim 2, wherein one side of the valve body adjacent to the push button is provided with a perforation in communication with the accommodating cavity, the control member comprises an abutment portion, and the abutment portion is arranged to pass through the perforation to be in sliding fit with the introducing member.

4. The waterway control device according to claim 3, wherein the control member further comprises a sealing body, the sealing body is a flexible body, the sealing body is arranged on the abutment portion, and the sealing body is capable of being in flexible sealing fit with the water inlet and/or the water outlet when the control member is at the first position.

5. The waterway control device according to claim 3, wherein the control member is further provided with a first seal ring, the accommodating cavity comprises a first fitting cavity, the water inlet and the perforation are provided on two ends of the wall of the accommodating cavity opposite to a sidewall of the first fitting cavity, the first seal ring is capable of being kept in abutment and fit with a wall of the first fitting cavity, and the water outlet and the water inlet are provided on a same end of the wall of the accommodating cavity opposite to the wall of the first fitting cavity.

6. The waterway control device according to claim 3, wherein the wall of the accommodating cavity is provided with a guide member, an extension direction of the guide member is the same as a movement direction of the control member, and the control member is provided with a guide hole fitting with the guide member.

7. The waterway control device according to claim 1, wherein the introducing member comprises a pressing portion and a retaining portion connected to the pressing portion,
a vertical distance between the pressing portion and the control member gradually decreases along a movement direction of the push button,
a vertical distance between the retaining portion and the control member is unchanged along the movement direction of the push button, and
the vertical distance between the retaining portion and the control member is less than a minimum value of the vertical distance between the pressing portion and the control member.

8. An oral irrigator handle, comprising:
a waterway control device, comprising:
a valve body, provided with an accommodating cavity;
a control member, arranged in the accommodating cavity;
a reset member, one end of the reset member abutting against the control member, and another end of the reset member abutting against a wall of the accommodating cavity; and
a push button, movably arranged on the valve body, and provided with an introducing member, the introducing member being in sliding fit with the control member, wherein
the introducing member is configured to cause the control member to move from a first position to a second position when the push button moves relative to the valve body, and the reset member enables the control member to restore and remain at the first position, the control member is capable of blocking the accommodating cavity when the control member is at the first position, the control member is capable of opening the accommodating cavity when the control member is at the second position, an inner diameter of the accommodating cavity gradually increases along a direction from the first position to the second position, and a shape of the control member matches a shape of the accommodating cavity, and the valve body is provided with a guide slot, an extension direction of the guide slot is the same as a movement direction of the push button, and the push button is provided with a slider in sliding fit with the guide slot, a sidewall of the guide slot in contact with the slider is provided with a plurality of first grooves, and a sidewall of the slider in contact with a wall of the guide slot is provided with a plurality of second grooves;

a housing, the waterway control device being arranged in the housing, the housing being provided with a via hole, and the push button passing through the via hole to the outside of the housing;

a spray pipe, passing through the housing, and provided with an outlet conduit, the outlet conduit being in communication with the accommodating cavity; and an inlet pipe, passing through the housing, and provided with an inlet conduit, the inlet conduit being in communication with the accommodating cavity.

9. The oral irrigator handle according to claim 8, wherein the wall of the accommodating cavity is provided with a water inlet and a water outlet, and the control member is arranged in the accommodating cavity;

the control member is in sealing fit with the water inlet and/or the water outlet when the control member is at the first position; and the control member is out of the sealing fit with the water inlet and the water outlet when the control member is at the second position.

10. The oral irrigator handle according to claim 9, wherein one side of the valve body adjacent to the push button is provided with a perforation in communication with the accommodating cavity, the control member comprises an abutment portion, and the abutment portion is arranged to pass through the perforation to be in sliding fit with the introducing member.

11. The oral irrigator handle according to claim 10, wherein the control member further comprises a sealing body, the sealing body is a flexible body, the sealing body is arranged on the abutment portion, and the sealing body is capable of being in flexible sealing fit with the water inlet and/or the water outlet when the control member is at the first position.

12. The oral irrigator handle according to claim 10, wherein the control member is further provided with a first seal ring, the accommodating cavity comprises a first fitting cavity, the water inlet and the perforation are provided on two ends of the wall of the accommodating cavity opposite to a sidewall of the first fitting cavity, the first seal ring is capable of being kept in abutment and fit with a wall of the first fitting cavity, and the water outlet and the water inlet are provided on a same end of the wall of the accommodating cavity opposite to the wall of the first fitting cavity.

13. The oral irrigator handle according to claim 10, wherein the wall of the accommodating cavity is provided with a guide member, an extension direction of the guide member is the same as a movement direction of the control member, and the control member is provided with a guide hole fitting with the guide member.

14. The oral irrigator handle according to claim 8, wherein the introducing member comprises a pressing portion and a retaining portion connected to the pressing portion, a vertical distance between the pressing portion and the control member gradually decreases along a movement direction of the push button, a vertical distance between the retaining portion and the control member is unchanged along the movement direction of the push button, and the vertical distance between the retaining portion and the control member is less than a minimum value of the vertical distance between the pressing portion and the control member.

* * * * *